June 15, 1965  P. SALZ ETAL  3,189,023
BLOOD PRESSURE INDICATING DEVICE
Filed May 11, 1962

INVENTORS
PAUL SALZ
MARVIN B. BACANER
NICHOLAS W. YANNI
BY
ATTORNEY

United States Patent Office 3,189,023
Patented June 15, 1965

3,189,023
BLOOD PRESSURE INDICATING DEVICE
Paul Salz, Berkeley, Calif., Marvin B. Bacaner, Minneapolis, Minn., and Nicholas W. Yanni, Berkeley, Calif., assignors to the United States of America as represented by the United States Atomic Energy Commission
Filed May 11, 1962, Ser. No. 194,205
4 Claims. (Cl. 128—2.05)

The present invention relates to a sphygmometric device and more particularly to an electrical instrument for measuring and recording rapid changes in blood pressure.

The blood pressure indicating instruments commonly in use measure instantaneous systolic and diastolic pressure values at spaced apart time intervals, but provide no indication of short term variations occurring within a single pulse. Further, such instruments do not provide continuous monitoring of blood pressure over a long time period. The present invention, in contrast, provides a detailed indication of pressure variations arising within a single heart beat which indication cannot be obtained by the standard technique. In addition, a continuous detailed record over many pulse cycles is obtained, the combination being extremely valuable both for physiological research studies and for diagostic purposes. It is of considerable importance, for example, to accurately determine physiological responses of a subject undergoing the sudden and intense acceleration attending the launching of a rocket and the present invention was devised to aid in operations of this type.

The present invention detects and translates the arterial pulse wave oscillations into an electrical signal which represents blood pressure. Thus continous pressure changes due to the heart's contraction may be followed. It is not necessary to cut into the blood vessel or restrict the blood flow, the pressure being detected through the vessel wall. It is, however, necessary to have access to the blood vessel so that the pressure transducer may be placed in intimate contact therewith.

The invention utilizes a compact transducer having a primary and a secondary coil which are disposed on opposite sides of the blood vessel. A spring pushes the two coils together so that the blood vessel is slightly flattened, but the internal pressure in the vessel resists such flattening and tends to keep the blood vessel circular. Thus the distance between the two coils depends upon the pressure within the blood vessel, such distance increasing with an increase in the blood pressure.

An alternating voltage with a frequency in the order of twenty kilocycles is impressed across the primary coil, the resultant signal induced in the secondary coil being amplitude modulated according to the distance therebetween. The signal output from the secondary is demodulated and the resultant applied to a chart recorder or similar indicating device. Special circuitry is included to increase the sensitivity of the instrument.

It is accordingly an object of this invention to provide a more sensitive and versatile instrument for monitoring blood pressure in a living subject.

It is another object of the present invention to provide a means for continuously detecting blood pressure changes.

It is another object of this invention to provide an instrument sensitive to rapid blood pressure changes in a living subject.

It is an object of the invention to provide a blood pressure recording instrument sensitive to pressure variations within a single heart pulse.

It is a further object of the invention to provide a compact means for measuring blood pressure which means may be applied to a blood vessel of an organism without requiring the opening of the vessel or the significant restriction of the blood flow therethrough.

The invention will be better understood by reference to the accompanying drawing of which:

Figure 1:
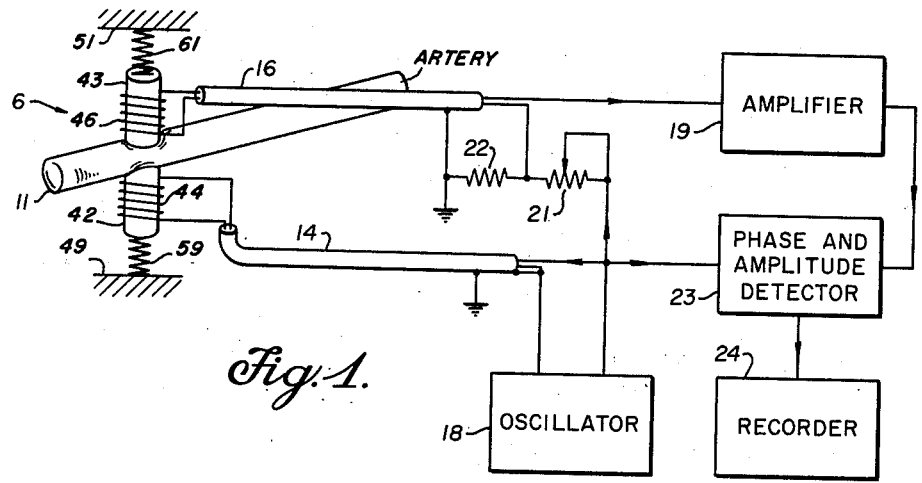
FIGURE 1 is a diagram showing the invention in schematic form.

Referring now to the drawing and more particularly to FIGURE 1, there is shown a transducer 6 adapted to be fitted on an artery 11 within which blood pressure is to be monitored. To best illustrate basic principles of the invention, transducer 6 is shown schematically in FIGURE 1, suitable mechanical structure for the unit being hereinafter described. Elements of the transducer 6 include identical primary and secondary coils 44 and 46 which are each wound on non-magnetic cylindrical cores 42 and 43. The cores 42 and 43, and thus the coils 44 and 46, are disposed along a common axis, one coil being on each side of the blood vessel 11 of which the blood pressure is to be taken. Thus to position the transducer 6, a surgical incision must be made.

A pair of compression springs 59 and 61 are utilized to urge coil cores 42 and 43 towards the blood vessel 11. Each such spring 59 and 61 is thus disposed coaxially with respect to cores 42 and 43 with one end bearing against the adjacent extremity of the core and the opposite end bearing against stationary surfaces 49 and 51 which may be the transducer housing as will hereinafter be described. The springs 59 and 61, acting through the coil cores 42 and 43, thus cause a slight deformation of blood vessel 11 which deformation is resisted by the internal pressure of the vessel.

To connect the transducer 6 with associated circuitry, shielded two conductor input and output cables 14 and 16 are connected across primary and secondary coils 42 and 43 respectively. The shields of both cables 14 and 16 are grounded in the conventional manner to circuit ground.

An oscillator 18 has an output coupled through the input cable 14 to the primary coil 44 in the transducer 6. Thus an output signal is induced in secondary coil 46 which output signal has an amplitude approximately inversely proportional to the spacing between the two coils. This spacing is in turn proportional to the internal pressure within blood vessel 11 and thus the secondary coil signal amplitude will vary according to the subject's blood pressure. The secondary output signal is coupled through output cable 16 to the input of an amplifier 19. A voltage divider comprised of a variable resistor 21 in series with a resistor 22 is connected from the output of the oscillator 18 to ground. A connection from the juncture of the voltage divider resistors 21 and 22 through the secondary coil in the transducer 6 to the input of the amplifier 19 provides a low level signal which is added 180° out of phase with potentials induced in the secondary. By adjusting the variable resistor 21, the signal applied to the amplifier 19 may be reduced to near zero. Changes in blood pressure cause changes in the amplitude of the amplifier 19 input signal which vary around zero potential instead of being superimposed on a large steady state signal, thus only the variable portion of the signal is retained and the steady state portion is substantially eliminated. The resultant signal is more readily detectable and the sensitivity of the instrument is enhanced.

Since the input signal applied to the amplifier 19 may be either in phase with the oscillator signal or 180° out of phase with the oscillator signal, depending upon whether the signal from the input cable 16 is greater or less than the cancelling signal from the voltage divider 21 and 22, the output of the amplifier 19 is phase compared with the oscillator 18 signal in a phase and amplitude detector 23. The output of the phase detector 23 is read on a chart recorder 24 or any similar voltage indicating instrument.

Figure 2:
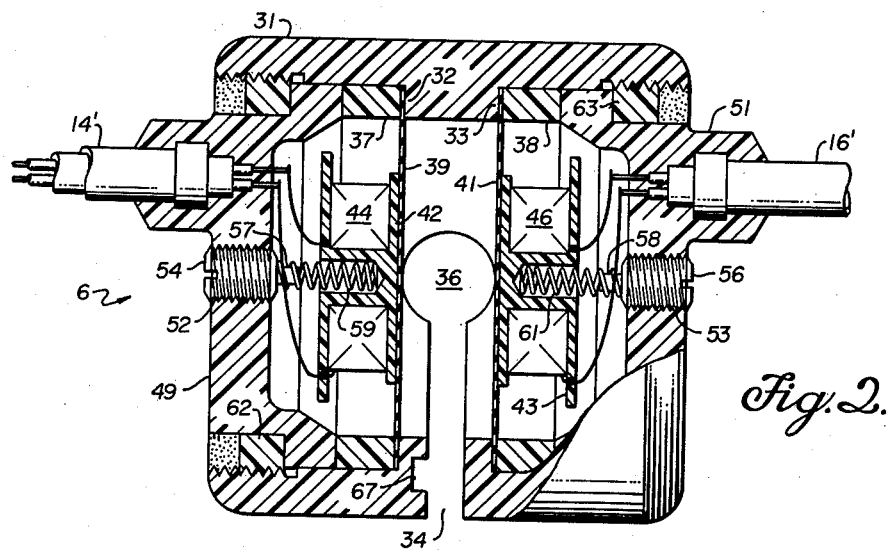
FIGURE 2 is a longitudinal section view showing the mechanical structure of the transducer element of the invention.

Referring now to FIGURE 2, a preferred mechanical structure for the transducer 6 is shown, the element being shown in enlarged form for greater clarity. To facilitate attachment of the unit in a living subject, it is preferably made as small as is possible and may typically have a length and a diameter each less than one-half inch.

The transducer 6 is contained within a cylindrical casing 31 which is internally threaded at each end and which is formed of a dielectric material such as epoxy plastic. The central section of the axial bore of casing 31 is of reduced diameter, forming a pair of annular shoulders 32 and 33 therein. A transverse slot 34 is formed in the central section between the shoulders 32 and 33 for receiving a blood vessel. Slot 34 extends to the center of the casing 31, communicating with a circular opening 36 which passes transversely through the casing 31.

Circular diaphragm holder rings 37 and 38 are disposed coaxially against shoulders 32 and 33 respectively. Thin flexible polyethylene diaphragms 39 and 41 are cemented to each of the diaphragm rings 37 and 38, the diaphragms being disposed between the shoulders and the rings. Coil forms 42 and 43 are cemented to the central portion of the diphragms 39 and 41 respectively in coaxial relationship thereon, coils 44 and 46 being wound on forms 42 and 43 respectively. Annular end pieces 49 and 51 abut diaphragm rings 37 and 38 respectively and support and secure the terminations of shielded, dual conductor input and output cables 14' and 16'.

Small central threaded holes 52 and 53 are provided in each of the end pieces 49 and 51 respectively. Spring pressure adjusting screws 54 and 56 are engaged in each of the holes 52 and 53, each screw having an axially projecting lug 57 and 58 respectively which extends into the inside of the casing 31. Coil springs 59 and 61 fit snugly over the lugs 57 and 58, pressing inwardly against the coil forms 42 and 43 respectively. The coil forms 42 and 43, being secured to the flexible diaphragms 39 and 41, are therefore urged together so that a blood vessel placed in the opening 36 is slightly compressed between the diaphragms. The rings 37, 38 and end pieces 49 and 51 are secured in the described positions within the casing 31 by retainer nuts 62 and 63 which engage internal threads at each end of the casing 31. Wherever possible the various components of the transducer 6 are made from a chemically inert material such as an epoxy resin.

Figure 3:
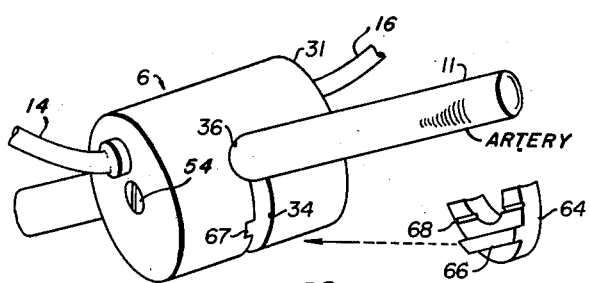
FIGURE 3 is a perspective view illustrating the application of the transducer to a blood vessel.

Referring now to FIGURE 3, there is shown the blood vessel 11 inserted into the slot 34 to the opening 36 where it is slightly compressed between the diaphragms 39 and 41 of FIGURE 2. To prevent the blood vessel 11 from inadvertently slipping out through the slot 34, a bridge piece 64 is fitted into the slot 34 by movement in a direction parallel to opening 36. A locating tongue 66 on bridge 64 is slidable into a corresponding groove 67 in the edge of the slot 34 to hold the bridge in position. A breather groove 68 is provided in the bridge piece 64 to insure equal pressure inside and outside the casing 31.

Referring now again to FIGURE 2, electrical connections are made from the input and output cables 14' and 16' to the coils 44 and 46. To avoid degrading the electrical properties of the device, the springs 59 and 61 should have no shorted turns. The screws 54 and 56 are adjustable to allow the device to be used with blood vessels of different sizes or to alter the pressure applied to the vessel.

Considering now the operation of the invention and with reference to all figures of the drawing, a blood vessel 11 in the subject is exposed by surgical incision and the transducer is positioned around the blood vessel. The electronic circuitry is activated and the potentiometer 21 is adjusted to provide approximately zero input to the amplifier 19. Any changes in the internal pressure of the vessel 11 are indicated by a voltage output from the phase detector 23 which voltage varies around zero potential. If the organism should move or be moved, as in an accelerating rocket, both the primary and secondary coils move together and the pressure readings are substantially unaffected.

Where absolute pressure readings are required, the instrument may be initially calibrated by comparison with absolute pressure indicating devices, both being applied to the subject simultaneously.

Since the transducer 6 typically has a length of less than one-half inch and a diameter of approximately one-half inch, it will be seen that the mass of the coils 44 and 46 necessarily is quite low. Thus the instrument may respond to the very rapid changes in pressure. In the embodiment herein described, the electronic equipment was transistorized and battery operated, thereby making the unit portable and self contained.

It will be apparent to those skilled in the art that many variations and modifications are possible without departing from the spirit and scope of the invention and thus it is not intended to limit the invention except as defined in the following claims.

What is claimed is:

1. In a sphygmomanometric apparatus for indicating rapid changes in blood pressure in a blood vessel, the combination comprising a casing having a slot therein for receiving said blood vessel, a first diaphragm and a second substantially parallel diaphragm disposed in said casing on opposite sides of said slot, a first coil and a second coil movable with said first and second diaphragms respectively, a first spring and a second spring compressed between said casing and said first and second diaphragms respectively, a source of alternating current connected to said first coil, and a voltage amplitude detector connected to said second coil.

2. In a device for detecting the changes in pressure within a blood vessel, the combination comprising a first coil and a second coil disposable on opposite sides of said blood vessel, means compressing said coils together to produce a slight deformation of said blood vessel, an oscillator having an output signal connected to said first coil, means coupling a portion of the output signal of said oscillator to said second coil in inverse phase from the signal applied to said first coil, an amplifier having an input coupled to said second coil, and a phase and amplitude detector having a first input terminal connected to the output of said amplifier and having a second input terminal connected to the output signal of said oscillator.

3. In an instrument for detecting changes in pressure within a blood vessel, the combination comprising a casing having a transverse slot therein for receiving said blood vessel, a first diaphragm and a second substantially parallel diaphragm disposed in said casing on opposite sides of said slot for contact with opposite sides of said vessel, a first coil retainer and a second coil retainer attached to said first and second diaphragms respectively, a first resilient means and a second resilient means disposed between said casing and said first and said second coil retainers respectively and tending to urge said coil retainers together, a first coil and a second coil disposed on said first coil retainer and said second coil retainer respectively, an alternating current source connected to said first coil, and an amplitude detector connected to said second coil.

4. An instrument for detecting changes in pressure within a blood vessel as described in claim 3 and further comprising means for adjusting the pressure exerted by said first and second resilient means on said first and second coil retainers respectively.

(References on following page)

References Cited by the Examiner

UNITED STATES PATENTS

| | | | |
|---|---|---|---|
| 2,514,847 | 7/50 | Coroniti | 33—143 |
| 2,544,459 | 3/51 | Kanner | 128—346 |
| 2,875,750 | 3/59 | Boucke | 128—2.05 |
| 2,921,584 | 1/60 | DiVette | 128—346 |
| 3,016,056 | 1/62 | Jacobs | 128—346 |
| 3,100,889 | 8/63 | Cannon | 33—143 |

OTHER REFERENCES

Sarbacher: "Encyclopedic Dictionary of Electronics," page 920, published 1959 by Prentice-Hall, TK 7804 S37, copy in Group 480.

RICHARD A. GAUDET, *Primary Examiner.*

RICHARD J. HOFFMAN, *Examiner.*